(12) United States Patent
Tachiki

(10) Patent No.: US 10,427,265 B2
(45) Date of Patent: Oct. 1, 2019

(54) ROTATING TABLE DEVICE

(71) Applicant: Fanuc Corporation, Yamanashi (JP)

(72) Inventor: Shingo Tachiki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 193 days.

(21) Appl. No.: 15/420,806

(22) Filed: Jan. 31, 2017

(65) Prior Publication Data
US 2017/0239770 A1 Aug. 24, 2017

(30) Foreign Application Priority Data

Feb. 19, 2016 (JP) ................................. 2016-029720

(51) Int. Cl.
B23Q 16/10 (2006.01)
F16D 55/00 (2006.01)
F16D 59/02 (2006.01)

(52) U.S. Cl.
CPC ...... B23Q 16/105 (2013.01); B23Q 2220/004 (2013.01); F16D 59/02 (2013.01); F16D 2055/0058 (2013.01)

(58) Field of Classification Search
CPC ............ B23Q 16/105; B23Q 2220/004; B23Q 16/102; B23Q 11/0092; B23Q 11/0883;
(Continued)

(56) References Cited

U.S. PATENT DOCUMENTS 5,072,651 A  12/1991 Kagita
6,585,088 B1* 7/2003 Fontaine ................. B60T 1/065
                                                       188/170
(Continued)

FOREIGN PATENT DOCUMENTS

CN  101396797 A  4/2009
CN  101678524 A  3/2010
(Continued)

OTHER PUBLICATIONS

Japan Office Action, Decision to Grant a Patent dated Jul. 10, 2018 for Japan Patent Application No. 2016-029720.
(Continued)

Primary Examiner — Monica S Carter
Assistant Examiner — Mahdi H Nejad
(74) Attorney, Agent, or Firm — Winstead PC

(57) ABSTRACT

A rotating table is maintained in a stationary state by generating a clamping torque while ensuring a long enough lifetime of a plate spring. Provided is a rotating table device including: base members; a rotating member that is supported by the base members so as to be rotatable about an axis; a brake disk that is secured to the rotating member; and a clamping mechanism that clamps the brake disk, wherein the clamping mechanism is provided with a piston that is attached so as to be movable between a clamped position and an unclamped position in a direction along the axis with respect to the base members, a plate spring that is secured to the piston and the base members and that biases the piston toward the clamped position, and a coil spring that is disposed between the piston and the base members, and that constantly biases the piston toward the clamped position.

3 Claims, 6 Drawing Sheets

(58) Field of Classification Search
CPC ..... B23Q 16/10; Y10T 74/1494; Y10T 74/14; Y10T 74/1488; Y10T 29/5155; F16D 55/32; F16D 2055/0058; F16D 2121/16; F16D 2125/582; F16D 59/02
USPC .................. 269/57, 74, 63, 43; 74/813 L
See application file for complete search history.

(56) References Cited

U.S. PATENT DOCUMENTS

| | | | |
|---|---|---|---|
| 8,505,895 B2 | 8/2013 | Tatsuda | |
| 2010/0123278 A1* | 5/2010 | Tatsuda | B23Q 16/102 269/57 |
| 2010/0175505 A1* | 7/2010 | Tatsuda | B23Q 16/102 74/813 L |
| 2010/0258397 A1* | 10/2010 | Tatsuda | B23Q 5/56 188/382 |
| 2010/0319487 A1 | 12/2010 | Tatsuda | |
| 2012/0011964 A1 | 1/2012 | Tatsuda | |
| 2012/0024644 A1* | 2/2012 | Tatsuda | B23Q 16/105 188/264 B |
| 2012/0217691 A1 | 8/2012 | Tatsuda | |
| 2015/0367470 A1* | 12/2015 | Tezuka | B23Q 1/522 269/55 |
| 2016/0008939 A1 | 1/2016 | Masuya | |
| 2016/0243660 A1 | 8/2016 | Nishimura | |
| 2017/0136593 A1* | 5/2017 | Xia | B23Q 16/105 |
| 2017/0326702 A1* | 11/2017 | Osaki | B23Q 11/005 |

FOREIGN PATENT DOCUMENTS

| | | |
|---|---|---|
| CN | 102335825 A | 2/2012 |
| CN | 206487802 U | 9/2017 |
| DE | 202007017253 U1 | 2/2008 |
| DE | 102012008797 B3 | 8/2013 |
| EP | 0222312 A1 * | 11/1986 |
| EP | 2189241 A1 | 5/2010 |
| EP | 2314415 A1 | 4/2011 |
| JP | S63-154144 U | 10/1988 |
| JP | H01-121636 U | 8/1989 |
| JP | H02-145948 U | 12/1990 |
| JP | H03-044542 U | 4/1991 |
| JP | H03-120354 U | 12/1991 |
| JP | H04-105832 A | 4/1992 |
| JP | 2007125640 A | 5/2007 |
| JP | 2009018391 A | 1/2009 |
| JP | 2010-120118 A | 6/2010 |
| JP | 2010-214492 A | 9/2010 |
| JP | 2012020378 A | 2/2012 |
| JP | 2012020378 A * | 2/2012 |
| JP | 2012202484 A | 10/2012 |
| JP | 2016-020008 A | 2/2016 |
| JP | 2016-155219 A | 9/2016 |
| JP | 2017-089806 A | 5/2017 |

OTHER PUBLICATIONS

Japan Office Action, Office Action dated Jan. 16, 2018 for Japan Patent Application No. 2016-029720.
State Intellectual Property Office of People's Republic of China, Office Action dated Oct. 25, 2018 for China Patent Applciation No. 201710066787.5.
State Intellectual Property Office of People's Republic of China, Office Action dated Mar. 4, 2019 for China Patent Applciation No. 201710066787.5.
German Patent and Trade Mark Office, Office Action dated May 13, 2019 for German Patent Application No. 102017101903.0.

* cited by examiner

ROTATING TABLE DEVICE

CROSS-REFERENCE TO RELATED APPLICATIONS

This application claims priority from Japanese Patent Application No. 2016-029720, the contents of which are incorporated herein by reference.

TECHNICAL FIELD

The present invention relates to a rotating table device that is mounted in a machine tool or the like.

BACKGROUND ART

As a rotating mechanism of a rotating table device, mainly one of two systems, namely, a worm gear system and a direct drive system, is employed, and a clamping mechanism is provided in order to hold the indexing position of a rotating table during processing. In the case of a worm gear system, even in a stationary state, a minute amount of play occurs in an amount corresponding to the amount of backlash between a worm and a worm wheel. The clamping mechanism is employed in order to keep the rotating table in a stationary state without causing the play.

On the other hand, in the case of a direct drive system, a clamping mechanism is employed as a mechanism other than a motive power of a motor, which is used to hold the rotating table in a stationary state.

There are multiple types of clamping systems for realizing a clamping mechanism. Among them, a clamping mechanism based on a disk clamp system has a structure in which a brake disk, which is rotated together with a spindle that transmits a rotational force generated by the rotational drive device to the rotating table, is sandwiched between a piston, which is pneumatically or hydraulically driven, and a fixed member. By sandwiching the brake disk between the piston and the fixed member, the spindle and the rotating table connected thereto are kept in stationary states by means of frictional forces generated between the brake disk and the fixed member (for example, see Patent Literature 1).

Because the clamping mechanism is generally actuated by the action of pneumatic pressure, hydraulic pressure, or the like, it cannot be operated when a power supply to a pressure generator is halted due to a power outage or the like.

Because a rotating mechanism based on a worm gear system exhibits irreversible rotation whereby a rotational force is not transmitted from the output side to the input side, the rotating table is not rotated during a power-supply stoppage.

However, a rotating mechanism based on a direct drive system loses the holding power of a motor when the power supply to the motor is cut off, and the rotating table ends up being rotated so as to reach a stable point due to an inertial force of rotation or unbalanced torque due to a workpiece and a jig. The workpiece and a tool may become damaged when this rotation causes the workpiece and the tool to collide with each other.

In order to prevent these problems, a clamping mechanism employed in a rotating mechanism based on a direct drive system is normally provided with a biasing mechanism that biases the clamping mechanism in a clamping direction when a pneumatic pressure or a hydraulic pressure is not applied thereto (for example, see Patent Literature 2). In addition, there are systems in which another clamping device that generates a holding power only during a power-supply stoppage is provided, in addition to the clamping mechanism for holding the indexing position (for example, see Patent Literature 3).

In some cases, a disc-shaped plate spring is used as the biasing mechanism provided in the clamping mechanism that holds the indexing position of the rotating table. The plate spring has, in addition to a function for holding the clamped state by means of a restoring force generated by elastic deformation, a function for increasing the clamping torque by also utilizing, in addition to the frictional force between the fixed member and the brake disk, the frictional force between the piston and the brake disk to hold the brake disk by preventing the piston from being rotated.

CITATION LIST

Patent Literature

{PTL 1} Japanese Unexamined Patent Application, Publication No. 2012-202484
{PTL 2} Japanese Unexamined Patent Application, Publication No. 2012-20378
{PTL 3} Japanese Unexamined Patent Application, Publication No. 2007-125640

SUMMARY OF INVENTION

An object of the present invention is to provide a rotating table device with which it is possible to maintain a rotating table in a stationary state by generating a high enough clamping torque while ensuring a long enough lifetime of a plate spring.

Solution to Problem

An aspect of the present invention provides a rotating table device including: a base member; a rotating member that is supported by the base member so as to be rotatable about a predetermined axis; a brake disk that is secured to the rotating member; and a clamping mechanism that clamps the brake disk and maintains the rotating member in a stationary state with respect to the base member, wherein the clamping mechanism is provided with a piston that is attached so as to be movable, in a direction along the axis with respect to the base member, between a clamped position at which the clamping mechanism presses the brake disk in a plate-thickness direction by means of a working fluid and an unclamped position at which the clamping mechanism is separated from the brake disk, a plate spring that is secured to the piston and the base member and that biases the piston toward the clamped position by means of a restoring force generated by elastic deformation, and a coil spring that is disposed between the piston and the base member and that constantly biases the piston toward the clamped position by means of a restoring force generated by elastic deformation.

The above-described aspect may be provided with a working-fluid chamber into which the working fluid that drives the piston is made to flow, wherein the coil spring may be disposed in an installation space that is partitioned in an airtight state with respect to the working-fluid chamber.

The above-described aspect may be provided with a working-fluid chamber into which the working fluid that drives the piston is made to flow, wherein the coil spring may be disposed in an installation space that is connected to the working-fluid chamber.

DESCRIPTION OF EMBODIMENT

A rotating table device 1 according to an embodiment of the present invention will be described below with reference to the drawings.

Figure 1:
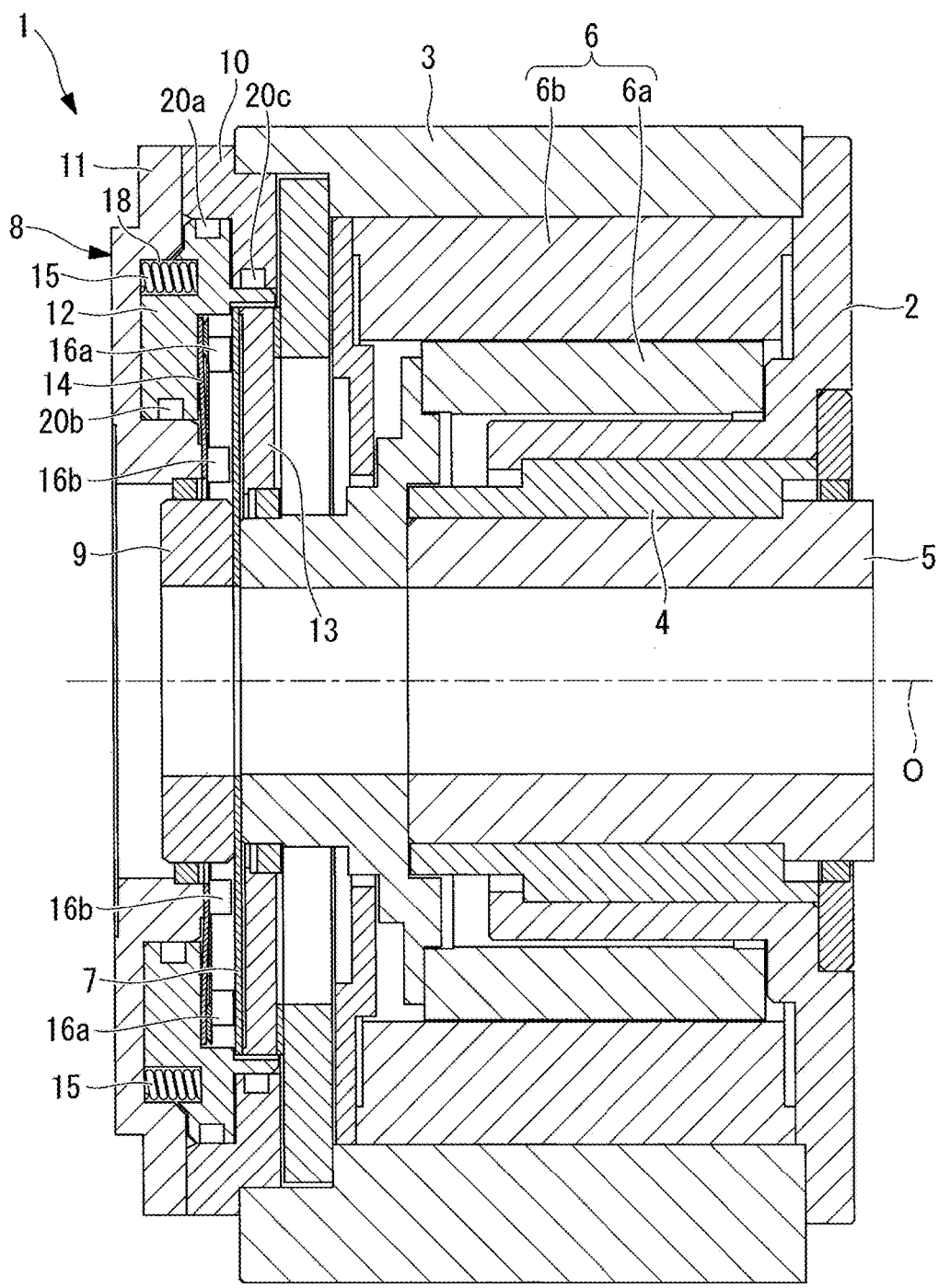
FIG. 1 is a longitudinal sectional view showing a rotating table device according to an embodiment of the present invention.

As shown in FIG. 1, the rotating table device 1 according to this embodiment is, for example, an indexing rotating table device of a direct drive system, and is provided with: a case (base member) 3 that is installed in an external structure of a machine tool or the like; a housing (base member) 2 that is secured to the case 3; a cylindrical shaft (rotating member) 5 that is supported by the housing 2 via a bearing 4 so as to be rotatable about a center axis (axis) O; a motor 6 that rotationally drives the shaft 5; a brake disk 7 that is secured to the shaft 5; and a clamping mechanism 8 that maintains the shaft 5 in a stationary state with respect to the housing 2.

The motor 6 is provided with a stator 6a that is secured to the housing 2 and a rotor 6b that is rotated with respect to the stator 6a. The rotor 6b is secured to the shaft 5.

The brake disk 7 is secured to the shaft 5 by being sandwiched between an end surface of the shaft 5 and an attaching member 9.

The clamping mechanism 8 according to the embodiment of the present invention is provided with: a cylinder 10 and a rear plate (base member) 11 that are secured to the case 3; a piston 12 that is supported so as to be movable in a direction along the center axis O with respect to the cylinder 10 between a clamped position at which the piston 12 comes into contact with the brake disk 7 in the plate-thickness direction of the brake disk 7 and an unclamped position at which the piston 12 is separated from the brake disk 7; a clamping member (base member) 13 that is disposed on the opposite side of the piston 12 with the brake disk 7 placed therebetween in the plate-thickness direction thereof; a spring disk 14 formed of a disc-shaped plate spring; and coil springs 15.

The spring disk 14 is secured to the piston 12 by means of a plurality of bolts 16a that are disposed with spaces therebetween in the circumferential direction and is secured to the rear plate 11 by means of a plurality of bolts 16b. By doing so, the piston 12 is restrained by the spring disk 14 so as to be movable in the axial direction with respect to the cylinder 10, but not to be rotatable in the circumferential direction.

Due to the positional relationship of surfaces in the rear plate 11 and the piston 12 to which the spring disk 14 is attached, the spring disk 14 is constantly elastically deformed. By doing so, the piston 12 is constantly biased in the direction in which the brake disk 7 is pressed against the clamping member 13 by means of a restoring force generated by elastic deformation of the spring disk 14. In other words, these components are configured so as to keep a clamped state in which the brake disk 7 is sandwiched between the piston 12 and the clamping member 13.

In FIG. 1, reference signs 20a, 20b, and 20c indicate sealing portions that seal air chambers 17a and 17b, described later.

Figure 2:
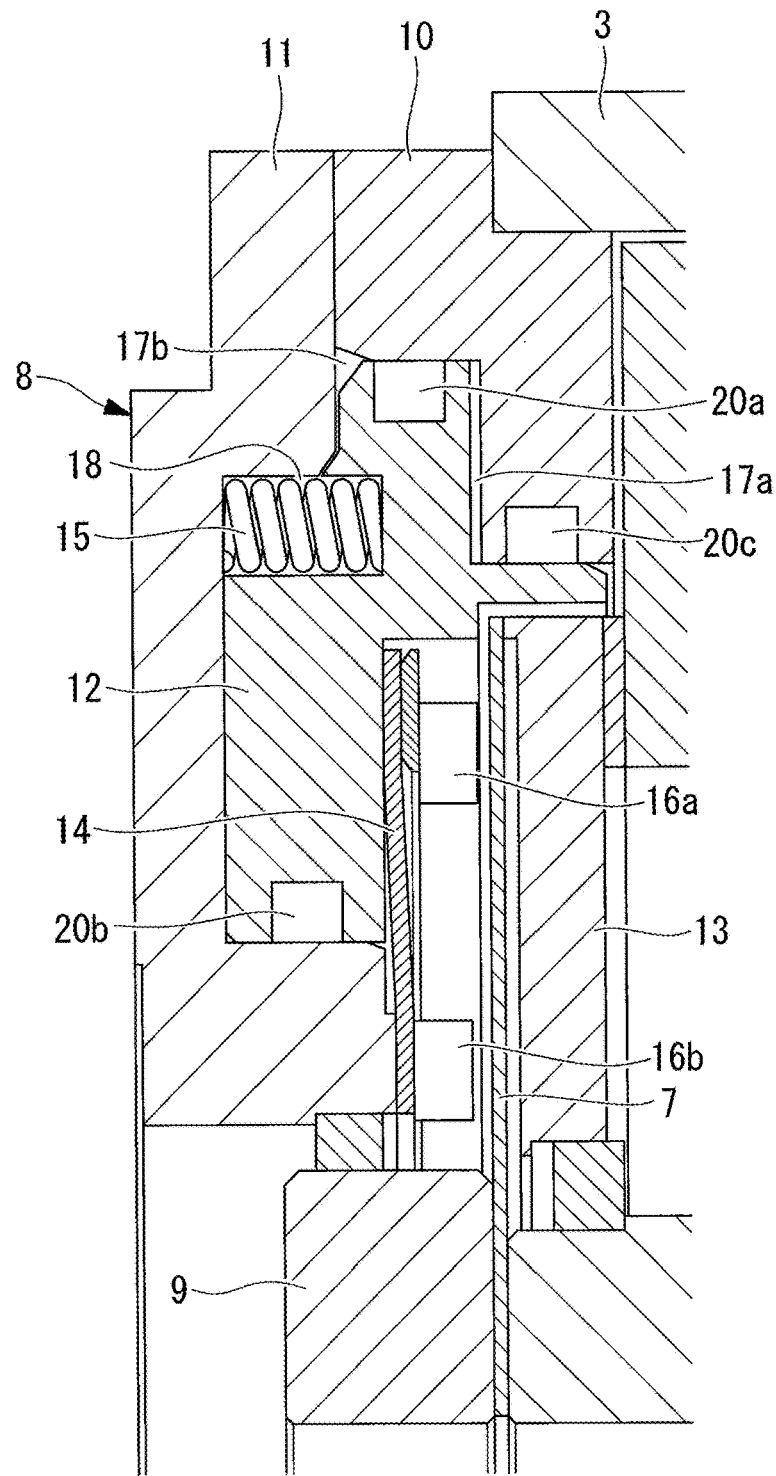
FIG. 2 is an enlarged longitudinal sectional view showing, in an unclamped state, a clamping mechanism provided in the rotating table device in FIG. 1.

When a power is being supplied to the rotating table device 1, as shown in FIG. 2, a compressed-air supply to the air chambers (working-fluid chambers) 17a and 17b is controlled by actuating an electromagnetic valve (not shown), and the clamping mechanism 8 switches between the clamped state and the unclamped state by means of the pressure of the compressed air.

Figure 3:
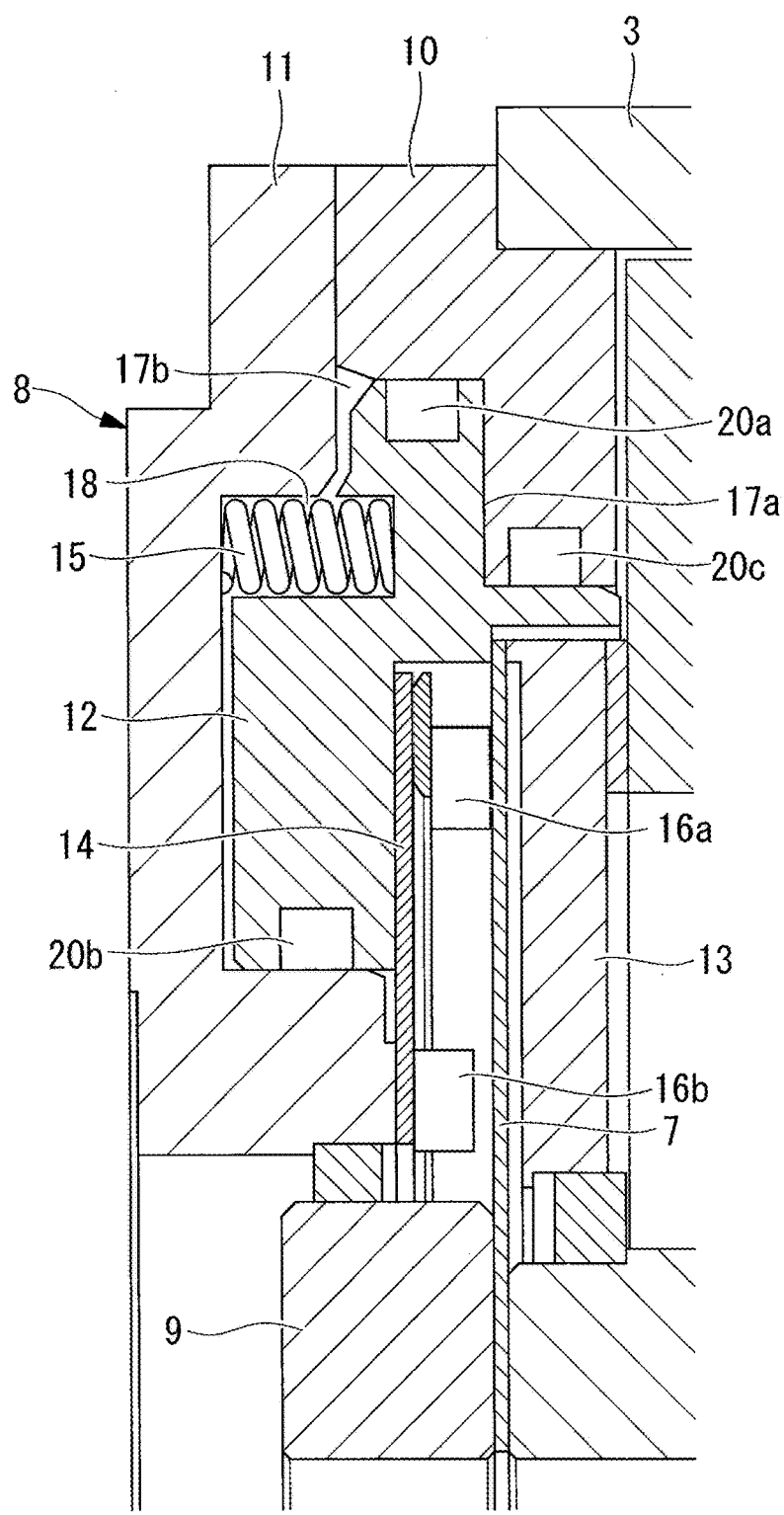
FIG. 3 is an enlarged longitudinal sectional view showing, in a clamped state, the clamping mechanism provided in the rotating table device in FIG. 1.

When the power is not supplied to the rotating table device 1, as shown in FIG. 3, because the compressed air is not supplied to either the air chamber 17a or 17b, the piston 12 sandwiches the brake disk 7 with the clamping member 13 by means of the restoring force generated by elastic deformation of the spring disk 14.

The plurality of coil springs 15 are disposed, with spaces therebetween in the circumferential direction, between the piston 12 and the rear plate 11. The coil springs 15 are compression coil springs that are disposed between the piston 12 and the rear plate 11 in a compressed state and that constantly bias the piston 12 toward the brake disk 7 by means of the restoring force generated by elastic deformation thereof.

In addition, in the examples shown in FIGS. 1 to 3, the coil springs 15 are disposed in installation spaces 18 connected to the air chamber 17b.

As shown in FIGS. 1 to 3, the sealing portions 20a, 20b, and 20c are configured so as to seal the space between the rear plate 11 and the piston 12 and the space between the cylinder 10 and the piston 12 in airtight states by accommodating sealing members such as O-rings, gaskets, or the like in circumferential grooves provided in the cylinder 10 or the piston 12. By doing so, the air chambers 17a and 17b are defined in sealed states.

The operation of the thus-configured rotating table device 1 according to this embodiment will be described below.

In the rotating table device 1 according to this embodiment, when an unclamping instruction is input to the electromagnetic valve in a state in which the power is supplied, the compressed air flows into the air chamber 17a, and the air in the air chamber 17b is expelled to outside. When the pressure of the compressed air that has flowed into the air chamber 17a exceeds the restoring forces generated by elastic deformations of the spring disk 14 and the coil springs 15, the piston 12 is moved toward the rear plate 11, as shown in FIG. 2, thus shifting to the unclamped state in which the brake disk 7 is released from the state in which the brake disk 7 is sandwiched between the piston 12 and the clamping member 13, which allows the shaft 5 to be rotated.

On the other hand, when a clamping instruction is input to the electromagnetic valve, the compressed air flows into the air chamber 17b, and the air in the air chamber 17a is expelled to the outside. When the piston 12 is pressed toward the brake disk 7 due to the pressure of the compressed air that has flowed into the air chamber 17b, as shown in FIG. 3, the clamping state shifts to the clamped state in which the brake disk 7 is sandwiched between the piston 12 and the clamping member 13, which maintains the shaft 5 in a stationary state with respect to the case 3.

When the power supply to the rotating table device 1 is turned off, because the compressed-air supply to either the air chamber 17a or 17b is halted, this causes a shift to a clamped state in which the piston 12 sandwiches the brake disk 7 with the clamping member 13 just by means of restoring forces generated by elastic deformations of the spring disk 14 and the coil springs 15.

The spring disk 14 is elastically deformed to the greatest degree in the unclamped state shown in FIG. 2, and the elastic deformation thereof is restored in the clamped state shown in FIG. 3, thus decreasing the amount of distortion.

Figure 4:
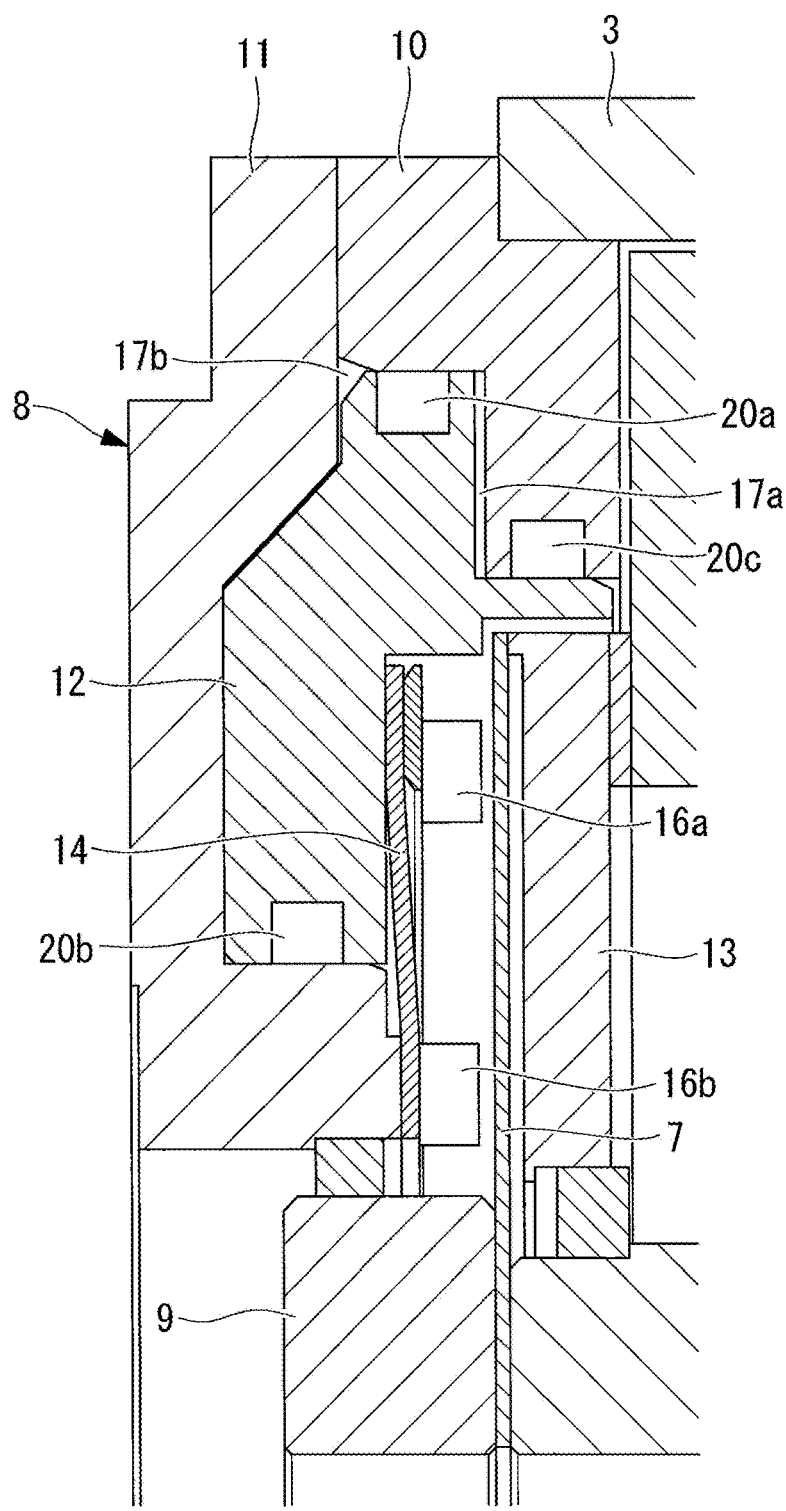
FIG. 4 is an enlarged longitudinal sectional view showing the clamping mechanism in the unclamped state in the case in which a coil spring is not provided.
Figure 5:
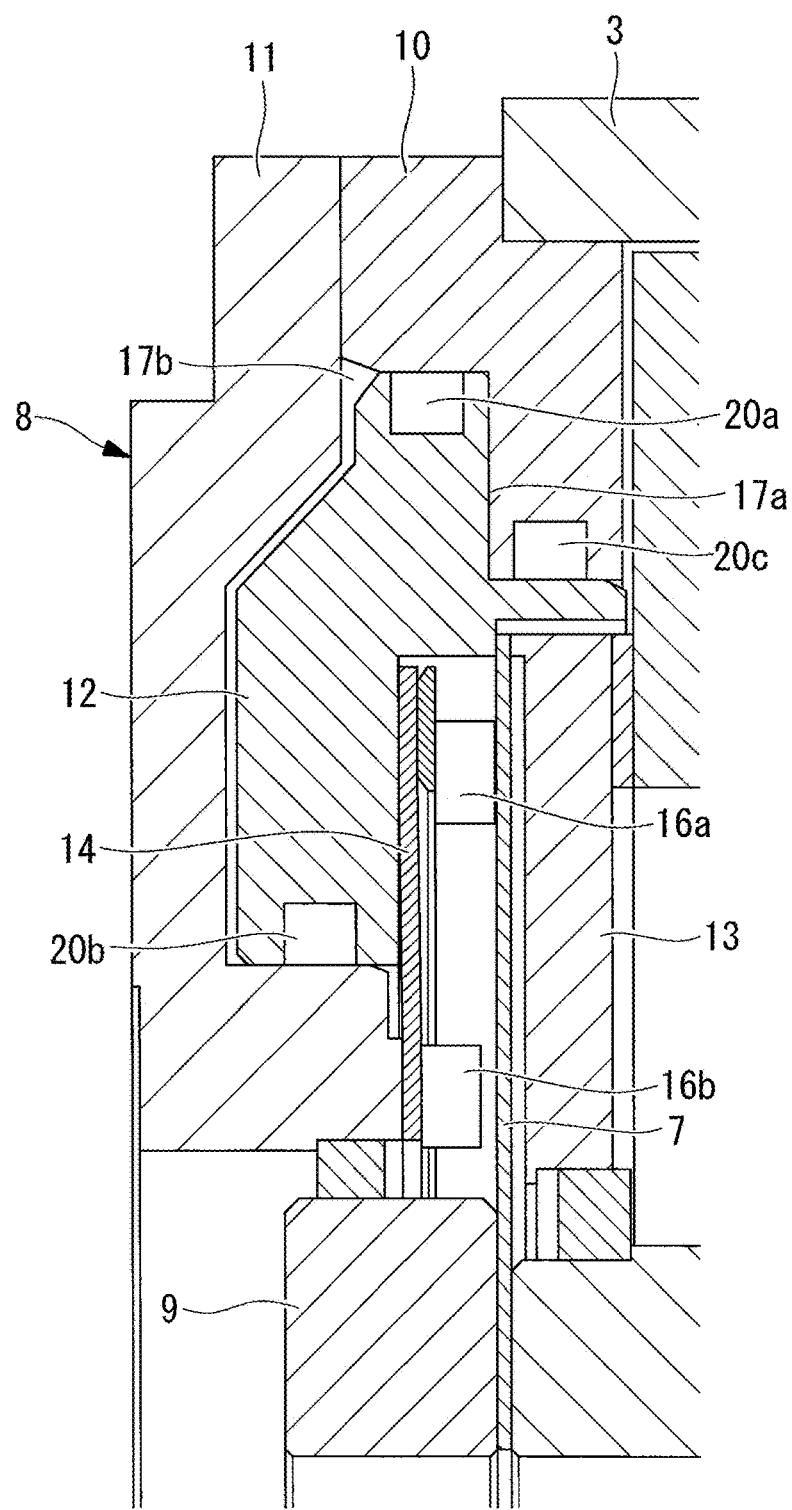
FIG. 5 is an enlarged longitudinal sectional view showing the clamping mechanism in the clamped state in the case in which a coil spring is not provided.

FIGS. 4 and 5 show reference examples in which the coil springs 15 are not provided.

As shown in FIG. 5, in the case in which the coil springs 15 are not provided, it is necessary to generate a frictional force with which it is possible to maintain the shaft 5 in the stationary state by means of the spring disk 14 even with the amount of distortion that has been decreased in the clamped state. Because of this, in the unclamped state shown in FIG. 4, the spring disk 14 must be elastically deformed by a greater amount of distortion as compared with that in the clamped state.

In contrast, with the rotating table device 1 according to this embodiment, because the piston 12 is biased toward the brake disk 7 by also using the coil springs 15, it is possible to decrease the amount of distortion of the spring disk 14 in the clamped state. Therefore, it is also possible to make the amount of distortion in the unclamped state smaller than that in the case of FIG. 4 in which the coil springs 15 are not provided.

As a result, it is possible to reduce the stress in the spring disk 14, which reaches a maximum in the unclamped state, and thus, it is possible to increase the lifetime of the spring disk 14.

Also, as has been described above, in the case in which the coil springs 15 and the spring disk 14 are used together, the coil springs 15 mainly play the role of biasing the piston 12 toward the clamped position, and thus, it suffices that the spring disk 14 only plays the role of preventing rotation of the piston 12.

Therefore, as the spring disk 14, it is possible to employ a spring disk having a small thickness. Because the maximum stress is lower and the fatigue strength is greater in a plate spring having a smaller thickness, by employing a thinner spring disk as the spring disk 14, it is possible to further increase the lifetime of the spring disk 14.

When the number of bolts 16a and 16b that secure the spring disk 14 to the piston 12 and the rear plate 11 is increased, the maximum stress tends to be increased due to stress concentration or the like. By decreasing stress due to distortion generated in the spring disk 14 by using the coil springs 15 together therewith, it is possible to suppress the maximum stress to a low level even when the number of bolts 16a and 16b is increased. By doing so, it is possible to increase the torsional rigidity with respect to a load that is applied to the piston 12 in the rotating direction in the clamped state, and it is also possible to suppress slippage between the piston 12 and the spring disk 14 or between the rear plate 11 and the spring disk 14.

Figure 6:
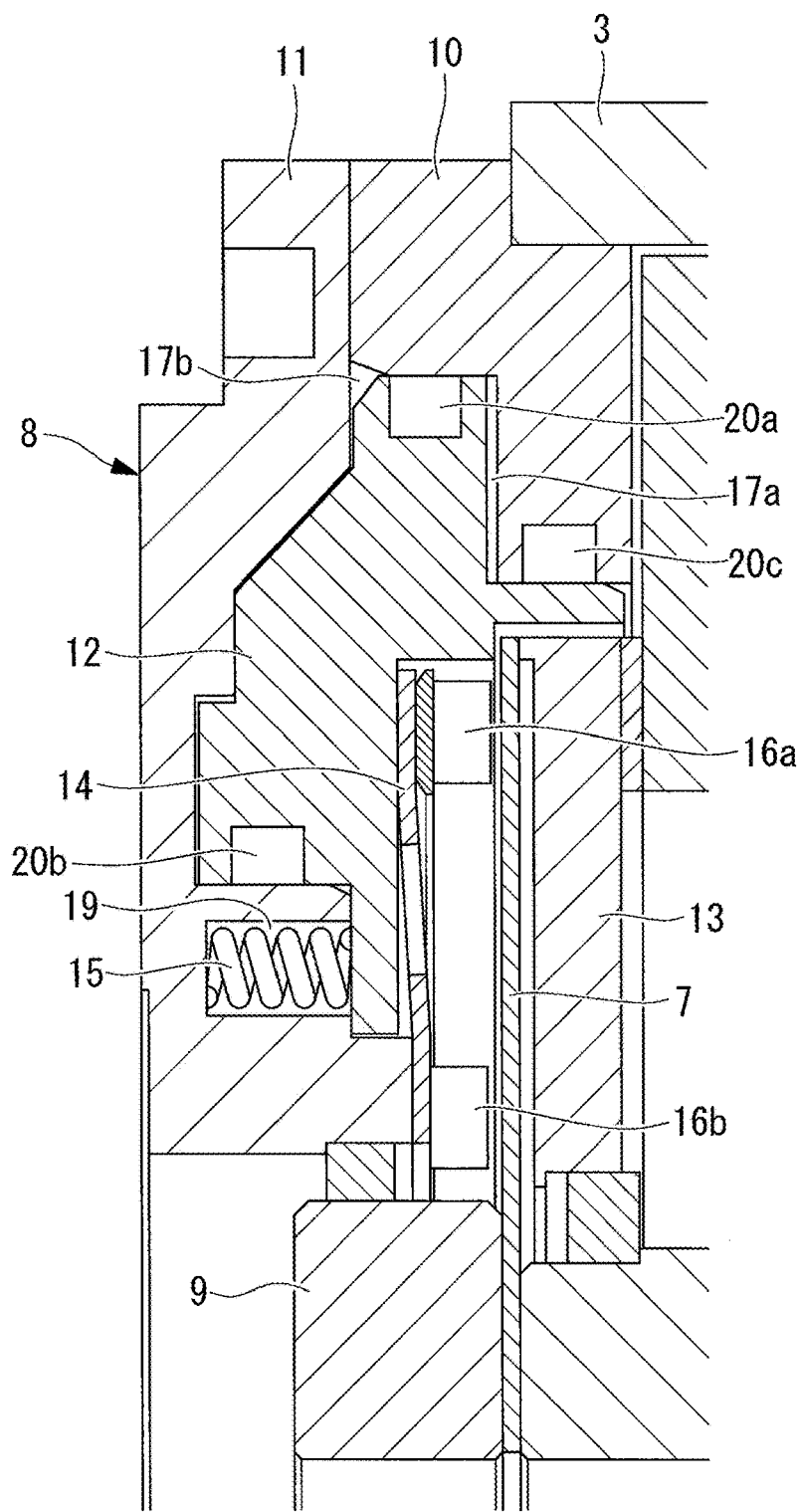
FIG. 6 is a partial enlarged longitudinal sectional view of a clamping mechanism showing a modification of the rotating table device in FIG. 1.

In this embodiment, although the installation spaces 18 for the coil springs 15 are arranged at positions connected to the air chamber 17b, alternatively, as shown in FIG. 6, the coil springs 15 may be disposed in installation spaces 19 that are isolated from the air chamber 17b in an airtight state by means of the sealing portions 20a and 20b.

As shown in FIGS. 1 to 3, in the case in which the installation spaces 18 for the coil springs 15 are connected to the air chamber 17b, the volume of the air chamber 17b is increased by an amount corresponding to the volumes of the installation spaces 18 provided, the number of which is equal to the number of coil springs 15. In the case in which the working fluid of the clamping mechanism 8 is a working fluid having compressibility, such as air or the like, when the volume of the air chamber 17b is increased, the amount of time required for the compressed air to be expelled from the air chamber 17b during unclamping and the amount of time required for the compressed air to be filled in the air chamber 17b during clamping may be slightly increased.

Because of this, the amount of time required for completing clamping or unclamping of the shaft 5 is increased, and thus, the amount of time required for completing indexing of a rotating table (not shown) secured to the shaft 5 may be increased.

Therefore, as shown in FIG. 6, by disposing the coil springs 15 in the installation spaces 19 that are isolated from the air chamber 17b in an airtight state, it is possible to minimize the volume of the air chamber 17b, and thus, there is an advantage in that it is possible to reduce the amount of time required for completing indexing of the rotating table.

In the example shown in FIG. 6, although the coil springs 15 are disposed radially farther inward relative to the air chamber 17b, there is no limitation thereto, and the coil springs 15 may be disposed at arbitrary positions so long as the portions at those positions can be isolated from the air chamber 17b in an airtight state.

In this embodiment, although the rotating table device 1 based on a direct drive system has been described as an example, the driving system is not limited thereto, and it is permissible to employ a rotating table device based on another driving system, such as a worm gear system or the like, or a rotating table device that does not include a driving mechanism.

Although the driving system of the clamping mechanism 8 is assumed to be a pneumatic driving system, alternatively, it is permissible to employ a clamping mechanism 8 using a working fluid other than air, such as a hydraulic driving system or the like.

As a result, the following aspect is read by the above described embodiment of the present invention.

An aspect of the present invention provides a rotating table device including: a base member; a rotating member that is supported by the base member so as to be rotatable about a predetermined axis; a brake disk that is secured to the rotating member; and a clamping mechanism that clamps the brake disk and maintains the rotating member in a stationary state with respect to the base member, wherein the clamping mechanism is provided with a piston that is attached so as to be movable, in a direction along the axis with respect to the base member, between a clamped position at which the clamping mechanism presses the brake disk in a plate-thickness direction by means of a working fluid and an unclamped position at which the clamping mechanism is separated from the brake disk, a plate spring that is secured to the piston and the base member and that biases the piston toward the clamped position by means of a restoring force generated by elastic deformation, and a coil spring that is disposed between the piston and the base member and that constantly biases the piston toward the clamped position by means of a restoring force generated by elastic deformation.

With this aspect, when a working fluid is supplied to place the clamping mechanism in the unclamped state, the pressure of the working fluid acts on the piston against the biasing forces of the plate spring and the coil spring, and thus, the piston is moved into the unclamped position. Because the piston is separated from the brake disk by doing so, friction is not generated between the piston and the brake disk, and thus, it is possible to freely rotate the rotating member with respect to the base member by operation of the motor.

On the other hand, when the working fluid is supplied to place the clamping mechanism in the clamped state, the pressure of the working fluid acts on the piston together with the restoring forces generated by elastic deformations of the plate spring and the coil spring, and thus, the piston is moved into the clamped position. By doing so, the piston presses the brake disk in the plate-thickness direction, and thus, the rotation of the rotating member with respect to the base member is stopped by means of the frictional forces generated between the piston and the brake disk and between the base member and the brake disk.

When the supply of the working fluid is halted, the piston is moved into the clamped position by means of the restoring forces generated by elastic deformations of the plate spring and the coil spring. In this case also, the piston presses the brake disk in the plate-thickness direction, and the rotation of the rotating member with respect to the base member is stopped by means of the frictional forces generated between the piston and the brake disk and between the base member and the brake disk.

In this case, if the coil spring is not provided, the piston must be pressed against the brake disk only by means of the restoring force generated by elastic deformation of the plate spring, and thus, the plate spring must remain in a state in which it is deformed by a relatively large amount even in a state in which the piston is placed in the clamped position. Because of this, the plate spring must be elastically deformed to an even greater degree in the unclamped position.

With this aspect, because the coil spring is used together with the plate spring, it is possible to suppress the elastic deformation of the plate spring to a low degree when the piston is placed in the clamped position, and thus, it is possible to reduce the stress generated in the plate spring when unclamping. In other words, it is possible to maintain the rotating table in a stationary state by generating a high enough clamping torque by means of the coil spring while ensuring a long enough lifetime of the plate spring.

The above-described aspect may be provided with a working-fluid chamber into which the working fluid that drives the piston is made to flow, wherein the coil spring may be disposed in an installation space that is partitioned in an airtight state with respect to the working-fluid chamber.

By doing so, it is possible to minimize the volume of the working-fluid chamber as much as possible, and thus, it is possible to enhance the responsiveness when actuating the piston to shift to the clamped position or the unclamped position.

The above-described aspect may be provided with a working-fluid chamber into which the working fluid that drives the piston is made to flow, wherein the coil spring may be disposed in an installation space that is connected to the working-fluid chamber.

The present invention affords an advantage in that it is possible to maintain a rotating table in a stationary state by generating a high enough clamping torque while ensuring a long enough lifetime of a plate spring.

REFERENCE SIGNS LIST

1 rotating table device
2 housing (base member)
3 case (base member)
5 shaft (rotating member)
7 brake disk
8 clamping mechanism
11 rear plate (base member)
12 piston
13 clamping member (base member)
14 spring disk (plate spring)
15 coil spring
17*a*, 17*b* air chamber (working-fluid chamber)
18, 19 installation space
O center axis (axis)

The invention claimed is:

1. A rotating table device comprising:
a base member;
a rotating member supported by the base member so as to be rotatable about a predetermined axis;
a brake disk that is secured to the rotating member; and
a clamping mechanism that clamps the brake disk and maintains the rotating member in a stationary state with respect to the base member;
wherein the clamping mechanism is provided with a piston that is attached so as to be movable, in a direction along the predetermined axis with respect to the base member, between a clamped position at which the clamping mechanism presses the brake disk in a plate-thickness direction via a working fluid and an unclamped position at which the clamping mechanism is separated from the brake disk;
a plate spring that is secured to the piston and the base member and that is formed to bias the piston toward the clamped position via only a restoring force generated by elastic deformation of the plate spring when a pressure of the working fluid is not acting; and
a coil spring that is disposed between the piston and the base member and that is configured to interpose the piston between the plate spring and the coil spring, and that constantly biases the piston toward the clamped position via a restoring force generated by elastic deformation of the coil spring.

2. The rotating table device according to claim 1, further comprising:
a working-fluid chamber into which the working fluid that drives the piston is made to flow; and
wherein the coil spring is disposed in an installation space that is partitioned in an airtight state with respect to the working-fluid chamber.

3. The rotating table device according to claim 1, further comprising:
a working-fluid chamber into which the working fluid that drives the piston is made to flow; and
wherein the coil spring is disposed in an installation space that is connected to the working-fluid chamber.

* * * * *